United States Patent
Bostick et al.

(10) Patent No.: US 9,547,641 B2
(45) Date of Patent: Jan. 17, 2017

(54) DOMAIN SPECIFIC SALIENT POINT TRANSLATION

(71) Applicant: International Business Machines Corporation, Armonk, NY (US)

(72) Inventors: James E. Bostick, Cedar Park, TX (US); John M. Ganci, Jr., Cary, NC (US); Kent Hua, Irvine, CA (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 14/038,088

(22) Filed: Sep. 26, 2013

(65) Prior Publication Data

US 2015/0088484 A1  Mar. 26, 2015

(51) Int. Cl.
*G06F 17/28* (2006.01)
*G06F 17/27* (2006.01)
*G06F 17/30* (2006.01)

(52) U.S. Cl.
CPC ....... *G06F 17/2827* (2013.01); *G06F 17/2785* (2013.01); *G06F 17/28* (2013.01); *G06F 17/2809* (2013.01); *G06F 17/289* (2013.01); *G06F 17/2818* (2013.01); *G06F 17/2845* (2013.01); *G06F 17/2872* (2013.01); *G06F 17/30737* (2013.01)

(58) Field of Classification Search
CPC .. G06F 17/28; G06F 17/2809; G06F 17/2818; G06F 17/2827; G06F 17/2836; G06F 17/2845; G06F 17/2854; G06F 17/2872; G06F 17/289
See application file for complete search history.

(56) References Cited

U.S. PATENT DOCUMENTS 5,677,835 A * 10/1997 Carbonell ............... G06F 17/21
704/8
6,675,159 B1 * 1/2004 Lin et al.
(Continued)

FOREIGN PATENT DOCUMENTS

EP  2226733 A1  9/2010
WO  2006127965 A2  11/2006
(Continued)

OTHER PUBLICATIONS

Kluck et al., "The Domain-Specific Task of CLEF-Specific Evaluation Strategies in Cross-Language Information Retrieval", Cross-Language Information Retrieval and Evaluation, copyright Springer-Verlag Berlin Heidelberg 2001, LNCS 2069, pp. 48-56, 2001.

(Continued)

*Primary Examiner* — Richard Zhu
(74) *Attorney, Agent, or Firm* — Jason Sosa; William H. Hartwell

(57) ABSTRACT

A computer generates a target language text phrase from a source language text phrase. The computer receives a text phrase in a source language. The computer then determines one or more salient points of the received source language text phrase. The computer determines one or more salient points in a target language that correspond to the one or more source language salient points. The computer then generates a target language text phrase based on the one or more salient points in the target language.

20 Claims, 4 Drawing Sheets

(56) References Cited

U.S. PATENT DOCUMENTS

| | | | |
|---|---|---|---|
| 7,593,844 B1* | 9/2009 | Takeshita | 704/2 |
| 7,747,427 B2* | 6/2010 | Lee | G06F 17/2818 704/1 |
| 8,219,382 B2* | 7/2012 | Kim et al. | 704/2 |
| 8,265,924 B1 | 9/2012 | Cutler | |
| 2002/0111789 A1* | 8/2002 | Hull | 704/4 |
| 2003/0154071 A1* | 8/2003 | Shreve | 704/9 |
| 2008/0071521 A1* | 3/2008 | Larvet | 704/9 |
| 2008/0172637 A1* | 7/2008 | Chang | G06F 17/289 715/846 |
| 2009/0119095 A1* | 5/2009 | Beggelman et al. | 704/9 |
| 2010/0030552 A1* | 2/2010 | Chen et al. | 704/9 |
| 2010/0223047 A1* | 9/2010 | Christ | 704/4 |
| 2012/0017146 A1 | 1/2012 | Travieso et al. | |
| 2012/0109786 A1 | 5/2012 | Platek | |
| 2013/0007405 A1 | 1/2013 | Caskey et al. | |
| 2014/0149107 A1* | 5/2014 | Schilder | 704/9 |

FOREIGN PATENT DOCUMENTS

| | | |
|---|---|---|
| WO | 2006127965 A3 | 11/2006 |
| WO | 2009042931 A1 | 4/2009 |

OTHER PUBLICATIONS

Trim, Craig. "NLP-driven Ontology Modeling (Language Processing)". The Mechanics and Value of an Ontology Model. [online] [printed on Sep. 25, 2013]. <https://www.ibm.com/developerworks/community/blogs/nlp/entry/nlp_driven_ontology_modeling8>.

"Business Intelligence Reporting Services Narrative Science", copyright 2010-2013 Narrative Science, [online] [printed on May 7, 2013]. <http://narrativescience.com>.

"Translation Company Translation Services Translation Software Website Translation", copyright Translution 2005-2012. [online] [printed on May 7, 2013]. <http://www.translution.com/default.asp>.

\* cited by examiner

DOMAIN SPECIFIC SALIENT POINT TRANSLATION

FIELD OF THE INVENTION

The present invention relates generally to the field of linguistics and language processing and more particularly to natural language translation using domain specific salient point translations.

BACKGROUND OF THE INVENTION

Machine translation (MT) is the use of software to translate text from one natural language to another. Various methodologies exist in providing a machine translation including rule-based MT and statistics-based MT. Rule-based MT is a general term that denotes machine translation systems based on linguistic information about source and target languages determined from bilingual dictionaries and grammars covering the main semantic, morphological, and syntactic regularities of each language. Statistics-based MT translations are generated on the basis of statistical models whose parameters are derived from the analysis of bilingual text corpora.

Parsing or syntactic analysis is the process of analyzing a string of symbols in a natural language according to the rules of a formal grammar. Sentence parsing is often performed as a method of understanding the exact meaning of a sentence, sometimes with the aid of devices such as sentence diagrams. It typically emphasizes the importance of grammatical divisions such as subject and predicate.

An ontology formally represents knowledge as a set of concepts within a domain, or specific area of interest such as an industry domain, and the relationships between pairs of concepts. It can be used to model a domain and support reasoning about concepts. An ontology provides a shared vocabulary, which can be used to model a domain, that is, the type of objects and/or concepts that exist, and their properties and relations. An ontology model identifies these object or concepts and defines the relationship between them. Ontologies create a structural framework for organizing information and are used in artificial intelligence, the semantic web, and other areas as a form of knowledge representation about the world or some part of it.

SUMMARY

Embodiments of the present invention provide for a computer program product, system, and method for generating a target language text phrase from a source language text phrase. A computer receives a text phrase in a source language. The computer then determines one or more salient points of the received source language text phrase. The computer determines one or more salient points in a target language that correspond to the one or more source language salient points. The computer then generates a target language text phrase based on the one or more salient points in the target language.

DETAILED DESCRIPTION

Figure 1:
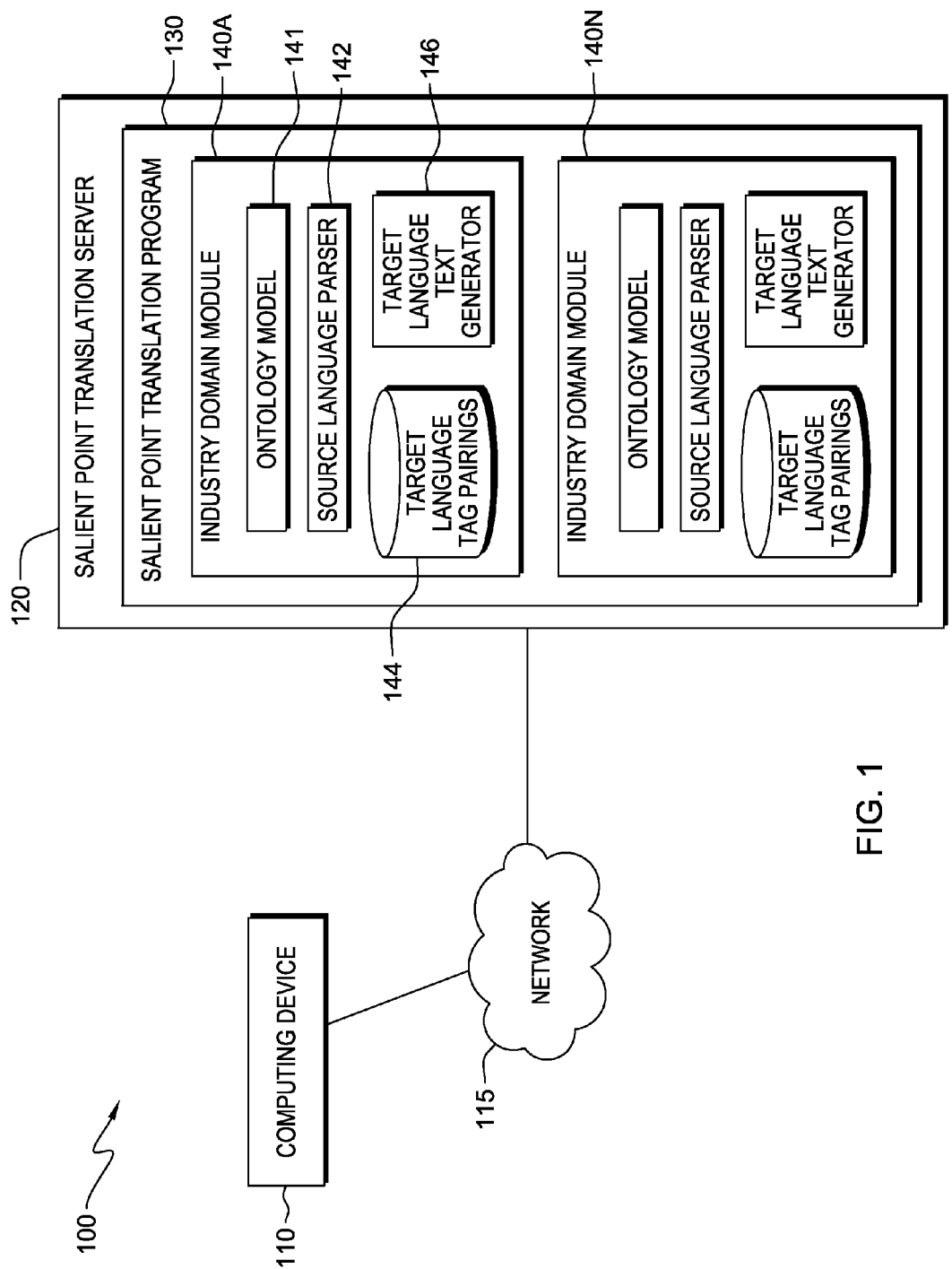
FIG. 1 is a block diagram illustrating a salient point translation system in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention generally describe a system that identifies the salient points of, for example, a portion of text in the context of a given industry domain. The industry domain specific salient points, or tags, in a source language can be matched to stored translations of the tags in a target language. The translated tags may then be used to generate new text in the target language.

The present invention will now be described in detail with reference to the figures. FIG. 1 is a block diagram illustrating salient point translation system 100 in accordance with an embodiment of the present invention. In one embodiment, salient point translation system 100 includes computing device 110, salient point translation server 120, and network 115 interconnecting at least computing device 110 and salient point translation server 120. In certain embodiments, computing device 110 and salient point translation server 120 represent different aspects of an integrated computing device, system, or environment.

Network 115 can be, for example, a local area network (LAN), and wide area network (WAN) such as the Internet, or a combination of the two, and can include wired, wireless, or fiber optic connections. In general, the network can be any combination of connections and protocols that will support communications between computing device 110 and salient point translation server 120.

In various embodiments of the invention, computing device 110 and salient point translation server 120, which are described in more detail below with respect to FIG. 4, can be a laptop computer, a tablet computer, a netbook computer, a personal computer (PC), a desktop computer, a mainframe computer, a networked server computer. Further, salient point translation server 120 can include computing systems utilizing clustered computers and components to act as a single pool of seamless resources when accessed via network 115, or can represent one or more cloud computing datacenters. In general, computing device 110 and salient point translation server 120 can be any programmable electronic device capable of executing the functionality required of an embodiment of the invention. In one embodiment, computing device 110 includes a client program (not shown) allowing a user to interact with salient point translation server 120 via network 115.

Salient point translation server 120 includes salient point translation program 130, and industry domain modules 140A through 140N. For illustrative purposes, FIG. 1 depicts modules for two industry domains, industry domain module 140A and industry domain module 140N. However, salient point translation server 120 may contain one industry domain module or additional industry domain modules, as desired for specific implementations.

Salient point translation program 130 operates to receive source language text from, for example, computing device 110 via network 115. The source language text may be, for example, a phrase, a sentence, a paragraph, or a narrative. For example, the text may be a product description, a product catalog, a marketing pitch, a logbook or a logbook entry.

In one embodiment, salient point translation program 130 determines the industry domain of the source language text by analyzing the text using, for example, IBM SPSS® software. An industry domain is a framework in which words and word phrases may have meaning that is specific to the particular industry. The industry domain framework also includes an ontology model for the particular industry that determines the relationships that exist between words and word phrases. Salient point translation program 130 can use key words or phrases, as determined below, to match the source language text to the appropriate industry domain. Using a statistical analysis, for example, salient point translation program 130 can determine for a group of key words or phrases, a confidence value that the group of key words or phrases belongs to a particular industry domain. Increasing the number of matches of key words or phrases to a particular industry domain increases the confidence that the source language text belongs to that industry domain. Examples of industry domains include, but are not limited to; automotive industry, oil and gas drilling industry, health care industry, and finance industry. The ontology models of the various industry domains determine that words or word phrases can have different meanings depending on the particular industry domain. For example, the phrase "bond yield" in the finance industry domain may describe "interest" or an interest rate on an investment, whereas in the automotive industry domain, the same phrase may describe "strength" of a material. In certain embodiments, the input from computing device 110 may also include the particular industry domain of the source language text. In various embodiments, salient point translation program 130 can continually scan the determined key words or phrases to ascertain the industry domain with the highest confidence.

A source language text may contain phrases or sentences from multiple industry domains. For example, a marketing brochure for an automobile may contain product information from an automotive industry domain, as well as purchase or lease financing information from a finance industry domain. In order to detect a change in industry domains within a source language text, salient point translation program 130 can limit the size of the group of key words or phrases used to determine the confidence value that the group of key words or phrases belongs to a particular industry domain. Thus, the confidence value can be determined for a portion of the source language text. Salient point translation program 130 can apply the industry domain with the highest confidence to the portion of the source language text. Salient point translation program 130 further operates to control the operation of industry domain modules 140A through 140N on salient point translation server 120.

The format of the source language text can vary depending on the use of the text. A marketing brochure, product catalog, or narrative can have different formats based on the intended use. In various embodiments, salient point translation program 130 determines the format of the source language text or portions of the source language text. For example, salient point translation program 130 can determine the font, color, and size of the text as well as whether the text is bold, underlined, or italicized. Salient point translation program 130 can further determine if the text is in a title or heading, a paragraph, a number list, a bulleted list, or the caption of a picture, table, or figure. The examples of formatting options are meant to be illustrative and not limiting. The determined format of the source language text can be used to determine the format of the generated target language text as further described below.

Each industry domain module 140A-140N includes ontology model 141, source language parser 142, target language tag pairings 144, and target language text generator 146. For illustrative purposes, industry domain modules 140A-140N are shown with a single target language text generator 146. However, certain embodiments of the invention may include multiple target language tag pairings 144 and multiple target language text generators 146, as desired for specific implementations.

In various embodiments, ontology model 141 defines the entities that exist in a domain and the relationships between them. As described above, words or word phrases can have different meanings depending on the particular industry domain. Ontology model 141 defines the relationship between the words or word phrases within the context of industry domain module 140A. Ontology model 141 can be, for example, a database that contains a listing of the relationships between words and phrases within the context of industry domain module 140A.

In various embodiments of the invention, source language parser 142, which is described in more detail below with respect to FIG. 2, receives text input in a source language from salient point translation program 130. Source language parser 142 performs a syntactic and semantic analysis of the received text to identify the salient points of the text. The syntactic analysis analyzes the structure of the sentence to determine how the various parts of the sentence relate to each other. For instance, a natural language parser program known in the industry, such as a dependency parser or phrase structure parser, may determine which groups of words form phrases, and which words are the subject or object of a verb within a text phrase, thus determining the key words or phrases of the received text.

Using the appropriate industry domain, as determined above, source language parser 142 performs the semantic analysis to determine the salient points, or tags, of the received source language text. The salient points or tags are derived from the determined key words or phases by scanning ontology model 141 of industry domain module 140A to determine the relationship between the key words or phrases within the context of the industry domain of industry domain module 140A, such that the derived tags are context-free (unambiguous) with respect to the industry domain. For example, as mentioned above, "yield" can have several meanings depending on the context. Within the finance industry domain, however, "yield" can have the unambiguous meaning of "interest rate," whereas within the automotive industry domain, "yield" can have the unambiguous meaning of "strength."

In various embodiments of the invention, target language tag pairings 144 is a database that contains source language tags and the corresponding translated tags in a target language specific to the industry domain associated with the industry domain module 140A-140N. The contents of target language tag pairings 144 can be created by, for example, manually translating the common tags associated with the industry domain of industry domain module 140A, using the context specific to industry domain module 140A. As such, target language tag pairings 144 contains a listing of the common tags associated with an industry domain and the corresponding translated tags in a target language. In other embodiments, target language tag pairings 144 may include a listing of the common tags and the corresponding tags translated into multiple target languages. For example, as mentioned above, "yield," within the context of the finance industry, can be entered into a database with the corresponding translations, also within the context of the finance industry, entered in one or more target languages. Salient point translation program 130 can operated to provide a user prompt requesting input if a determined tag is not listed in target language tag pairings 144. Salient point translation program 130 can further operate to update target language tag pairings 144 with the determined tag and the corresponding tag translated into one or more target languages. Salient point translation program 130 searches target language tag pairings 144 to determine the target language tags corresponding to the source language tags determined by salient point translation program 130.

In various embodiments of the invention, target language text generator 146 operates to receive target language tags from salient point translation program 130, and generate a phrase, sentence, paragraph, or narrative in a target language using a natural language text generator. For example, Quill™ by Narrative Sciences receives data or tags and generates a narrative structure based on a specified audience. Target language text generator 146 is configured with respect to the industry domain of industry domain module 140A such that the context of the generated narrative is specific to the industry domain of industry domain module 140A. Target language text generator 146 can also receive format information of the source language text that can be used to generate a similar format in the target language. Thus, a marketing brochure in the target language can look similar to the marketing brochure of the source language. In other embodiments, a shared target language text generator, not specific to an industry domain module, that receives the industry domain as a parameter may be used. As such, the target language text generator operates to receive configuration data from salient point translation program 130 prior to generating a narrative from the received target language tags. For example, target language text generator 146 receives translated tags and generates a product description, a product catalog, a marketing pitch, a logbook or a logbook entry in the target language.

Figure 2:
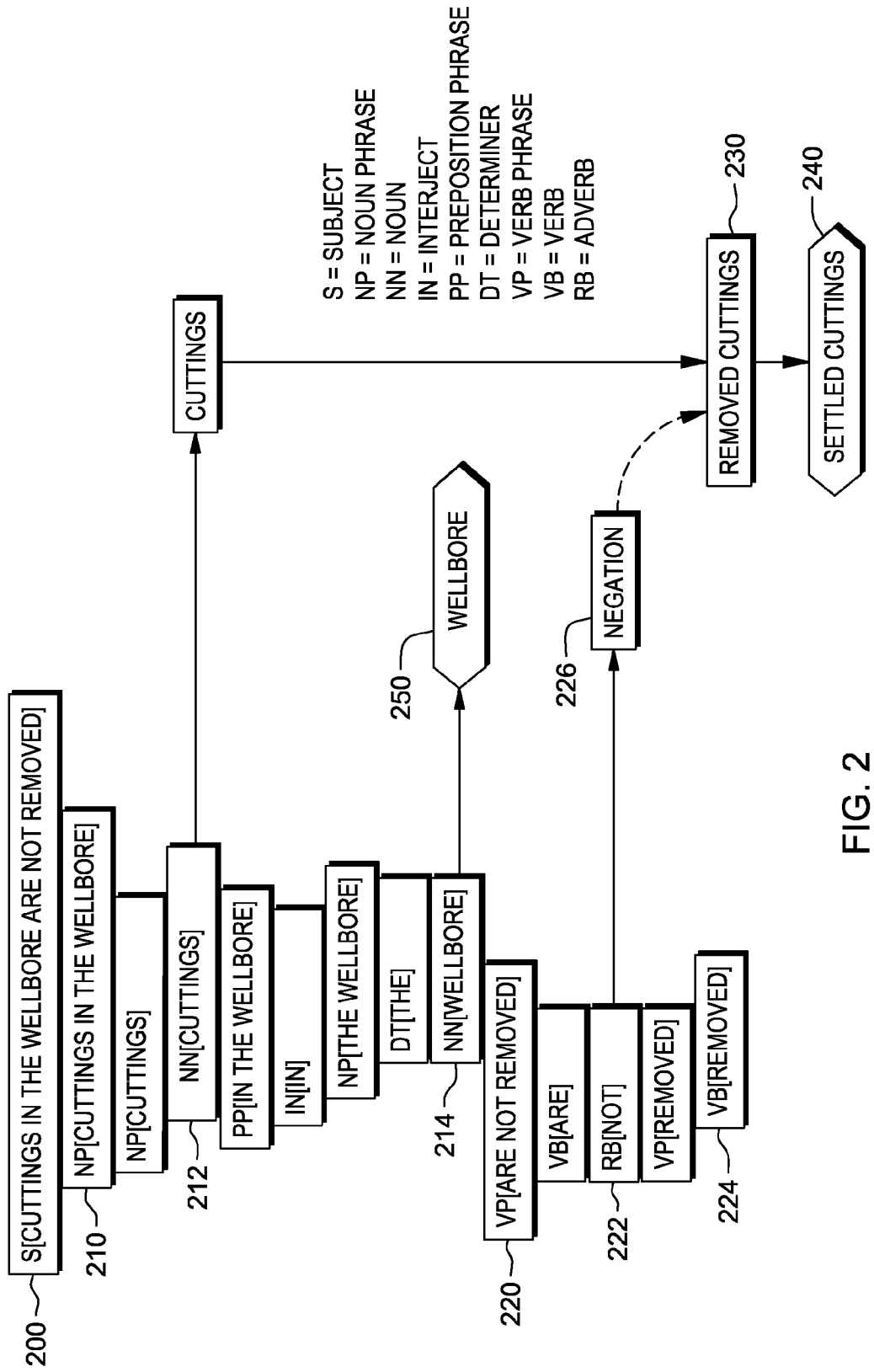
FIG. 2 illustrates a source language parser acting on a text phrase in accordance with an embodiment of the present invention.

FIG. 2 illustrates a source language parser 142 acting on a text phrase in accordance with an embodiment of the present invention. The legend lists the abbreviations for the various parts of speech indicated in FIG. 2. In this exemplary illustration, the text that is received by source language parser 142 is the subject 200 "cuttings in the wellbore are not removed." Source language parser 142 performs a syntactic analysis using grammatical rules and dictionaries to determine from subject 200 the following: noun phrase 210 "cuttings in the wellbore," and verb phrase 220 "are not removed." Source language parser 142 continues the syntactic analysis of noun phrase 210, determining noun 212 "cuttings" and noun 214 "wellbore." Analysis of verb phrase 220 by source language parser 142 determines adverb 222 "not," and verb 224 "removed." Source language parser 142 continues with a semantic analysis of the elements produced by the syntactic analysis of subject 200. Noun 212 may be paired with verb 224 resulting in "removed cuttings," depicted as phrase 230. Further, source language parser 142 determines that adverb 222 is a negation 226. The ontology model of the particular industry domain, oil and gas drilling in this example, determines that the negation 226 of phrase "removed cuttings" 230 results in salient point 240 "settled cuttings." In this example, source language parser 142 determines that the salient points of subject 200 within the oil and gas drilling industry domain are "settled cuttings" 240 and "wellbore" 250.

Figure 3:
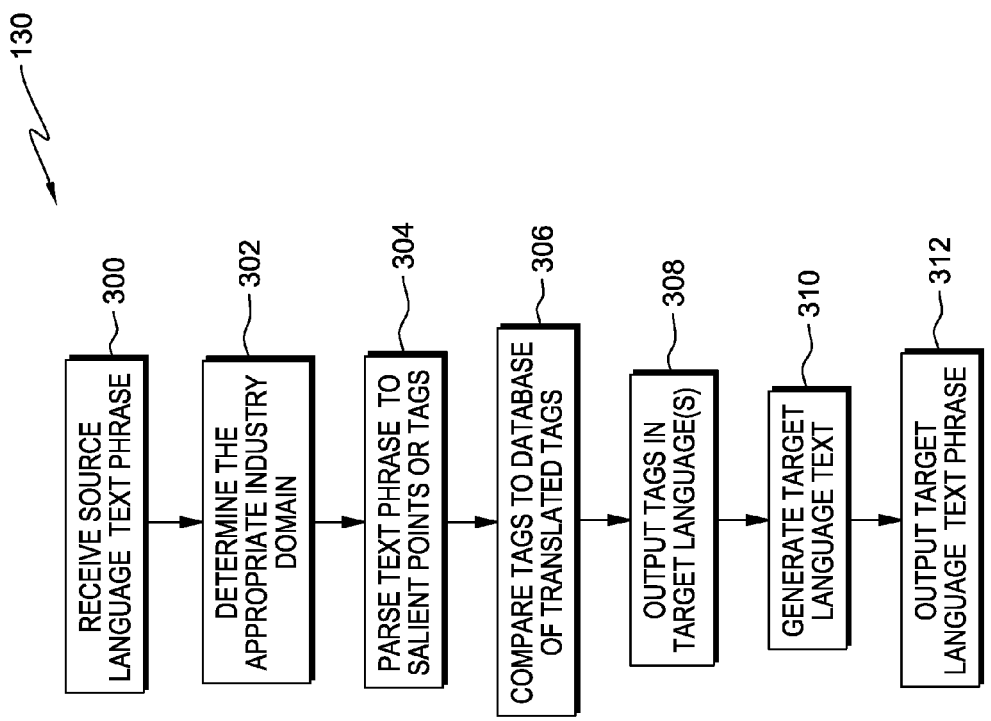
FIG. 3 is a flowchart showing the operational steps of a salient point translation program of a salient point translation system of FIG. 1 in accordance with an embodiment of the present invention.

FIG. 3 is a flowchart showing the operational steps of salient point translation program 130 of salient point translation system 100 of FIG. 1 in accordance with an embodiment of the present invention. Salient point translation program 130 receives a text phrase, for example, via a web interface (step 300). Salient point translation program 130 determines the appropriate industry domain of the received text phrase (step 302). Salient point translation program 130 sends the text phrase to the appropriate source language parser 142 according to the determined industry domain, wherein source language parser 142 parses the text phrase to determine the industry domain specific salient points or tags (step 304). Salient point translation program 130 compares the determined tags to a database of pre-translated tags and determines the corresponding tags in a target language, or target languages (step 306). Salient point translation program 130 outputs the target language tags to target language text generator 146 (step 308). Target language text generator 146 uses the translated, industry domain specific tags to generate text in the target language (step 310). Salient point translation program 130 sends the generated text in the target language(s) to computing device 110 (step 312).

Figure 4:
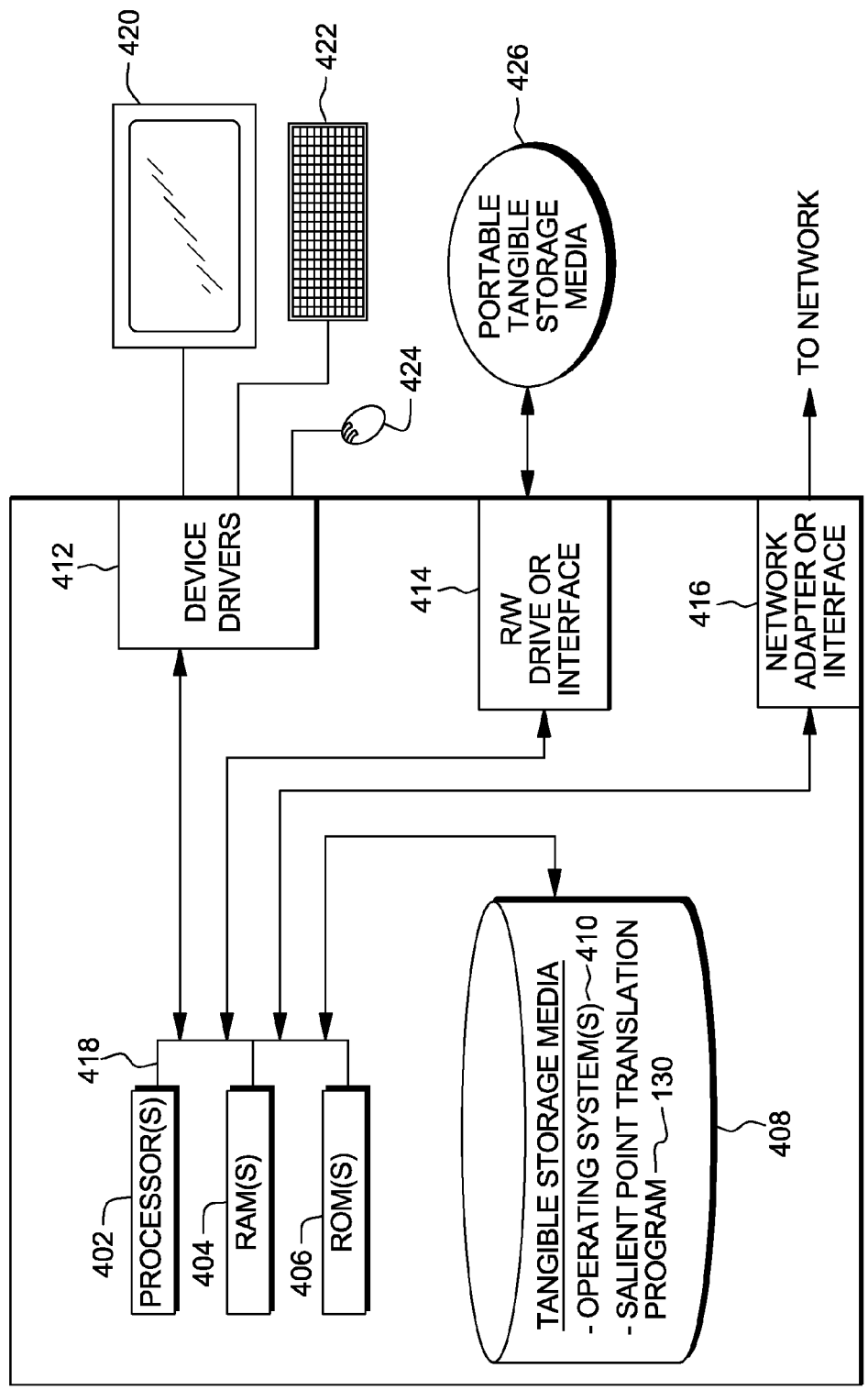
FIG. 4 shows a block diagram of components of a salient point translation server of a salient point translation system of FIG. 1, in accordance with an embodiment of the present invention.

FIG. 4 shows a block diagram of components of salient point translation server 120 of salient point translation system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Salient point translation server 120 can include one or more processors 402, one or more computer-readable RAMs 404, one or more computer-readable ROMs 406, one or more tangible storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within a system.

One or more operating systems 410 and salient point translation program 130 are stored on one or more of the computer-readable tangible storage media 408 for execution by one or more of the processors 402 via one or more of the respective RAMs 404 (which typically include cache memory). In the illustrated embodiment, each of the computer-readable tangible storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Salient point translation server 120 can also include a R/W drive or interface 414 to read from and write to one or more portable computer-readable tangible storage media 426. Salient point translation program 130 on salient point translation server 120 can be stored on one or more of the portable computer-readable tangible storage media 426, read via the respective R/W drive or interface 414 and loaded into the respective computer-readable tangible storage medium 408.

Salient point translation server 120 can also include a network adapter or interface 416, such as a TCP/IP adapter card for communications via a cable, or a wireless communication adapter. Salient point translation program 130 on salient point translation server 120 can be downloaded to the computing device from an external computer or external storage device via a network (for example, the Internet, a local area network or other, wide area network or wireless network) and network adapter or interface 416. From the network adapter or interface 416, the programs are loaded into the computer-readable tangible storage medium 408. The network may include copper wires, optical fibers, wireless transmission, routers, firewalls, switches, gateway computers and/or edge servers.

Salient point translation server 120 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 can comprise hardware and software (stored in computer-readable tangible storage medium 408 including computer-readable storage devices and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and program product have been disclosed for a presentation control system. However, numerous modifications and substitutions can be made without deviating from the scope of the present invention. Therefore, the present invention has been disclosed by way of example and not limitation.

What is claimed is:

1. A method for generating a target language narrative, the method comprising:
   receiving, by one or more processors, a text phrase in a source language;
   determining, by the one or more processors, an industry domain of the received source language text phrase;
   performing, by the one or more processors, a syntactic and semantic analysis of the received source language text phrase to determine one or more salient points representing the received source language text phrase, wherein the one or more salient points are context free with respect to the determined industry domain, such that the one or more salient points have unambiguous meanings outside of the context of the determined industry domain;
   translating, by the one or more processors, the determined one or more salient points of the source language, without translating the received source language text phrase itself, into one or more salient points of a target language; and
   generating, by the one or more processors, a target language narrative that includes the translated one or more salient points in the target language, utilizing a target language text generator configured with respect to the determined industry domain, such that a context of the generated narrative is specific to the determined industry domain.

2. A method in accordance with claim 1, wherein the one or more target language salient points are determined, by the one or more processors, from a stored list of source language salient points and corresponding target language salient points.

3. A method in accordance with claim 2, wherein the stored list includes corresponding target language salient points in multiple target languages.

4. A method in accordance with claim 1, wherein the one or more source language salient points are determined based, at least in part, on an ontology model, wherein the ontology model includes a listing of relationships between words within the context of the determined industry domain.

5. A method in accordance with claim 1, further comprising:
   determining, by the one or more processors, a format of the received source language text phrase.

6. A method in accordance with claim 5, further comprising:
   determining, by the one or more processors, a format of the generated target language narrative based on the determined format of the received source language text phrase.

7. The method of claim 1, wherein the determined format of the generated target language narrative is the same as the determined format of the received source language text phrase.

8. The method of claim 7, wherein the determined format of both the received source language text phrase and the generated target language narrative includes at least a text color.

9. The method of claim 7, wherein the determined format of both the received source language text phrase and the generated target language narrative includes at least a caption.

10. A computer program product for generating a target language narrative, the computer program product comprising:
    one or more computer-readable storage devices and program instructions stored on at least one of the one or more storage media, the program instructions comprising:
    program instructions to receive a text phrase in a source language;
    program instructions to determine an industry domain of the received source language text phrase;
    program instructions to perform a syntactic and semantic analysis of the received source language text phrase to determine one or more salient points representing the received source language text phrase, wherein the one or more salient points are context free with respect to the determined industry domain, such that the one or more salient points have unambiguous meanings outside of the context of the determined industry domain;
    program instructions to translate the determined one or more salient points of the source language, without translating the received source language text phrase itself, into one or more salient points of a target language; and
    program instructions to generate a target language narrative that includes the translated one or more salient points in the target language, utilizing a target language text generator configured with respect to the determined industry domain, such that a context of the generated narrative is specific to the determined industry domain.

11. A computer program product in accordance with claim 10, wherein the one or more target language salient points are determined from a stored list of source language salient points and corresponding target language salient points.

12. A computer program product in accordance with claim 11, wherein the stored list includes corresponding target language salient points in multiple target languages.

13. A computer program product in accordance with claim 10, wherein the one or more source language salient points are determined based, at least in part, on an ontology model, wherein the ontology model includes a listing of relationships between words within the context of the determined industry domain.

14. A computer program product in accordance with claim 10, further comprising:
    program instructions to determine a format of the received source language text phrase.

15. A computer program product in accordance with claim 14, further comprising:
    program instructions to determine a format of the generated target language narrative based on the determined format of the received source language text phrase.

16. A system for generating a target language narrative, the system comprising:
    one or more processors, one or more computer-readable memories, one or more computer-readable storage devices, and program instructions stored on at least one of the one or more storage media for execution by at least one of the one or more processors via at least one of the one or more memories, the program instructions comprising:

program instructions to receive a text phrase in a source language;

program instructions to determine an industry domain of the received source language text phrase;

program instructions to perform a syntactic and semantic analysis of the received source language text phrase to determine one or more salient points representing the received source language text phrase, wherein the one or more salient points are context free with respect to the determined industry domain, such that the one or more salient points have unambiguous meanings outside of the context of the determined industry domain;

program instructions to translate the determined one or more salient points of the source language, without translating the received source language text phrase itself, into one or more salient points of a target language; and program instructions to generate a target language narrative that includes the translated one or more salient points in the target language, utilizing a target language text generator configured with respect to the determined industry domain, such that a context of the generated narrative is specific to the determined industry domain.

17. A system in accordance with claim 16, wherein the one or more target language salient points are determined from a stored list of source language salient points and corresponding target language salient points.

18. A system in accordance with claim 16, wherein the one or more source language salient points are determined based, at least in part, on an ontology model, wherein the ontology model includes a listing of relationships between words within the context of the determined industry domain.

19. A system in accordance with claim 16, further comprising:

program instructions to determine a format of the received source language text phrase.

20. A system in accordance with claim 19, further comprising:

program instructions to determine a format of the generated target language narrative based on the determined format of the received source language text phrase.

\* \* \* \* \*